Nov. 24, 1953  C. E. DILTS  2,659,961
TURNING AND BORING MACHINE
Filed May 22, 1946  4 Sheets-Sheet 1

INVENTOR.
Carl E. Dilts.
BY Frank C. Farman
Attorney.

Nov. 24, 1953  C. E. DILTS  2,659,961
TURNING AND BORING MACHINE
Filed May 22, 1946  4 Sheets-Sheet 2

INVENTOR.
Carl E. Dilts
BY Frank C. Karman
Attorney.

Nov. 24, 1953  C. E. DILTS  2,659,961
TURNING AND BORING MACHINE
Filed May 22, 1946  4 Sheets-Sheet 3
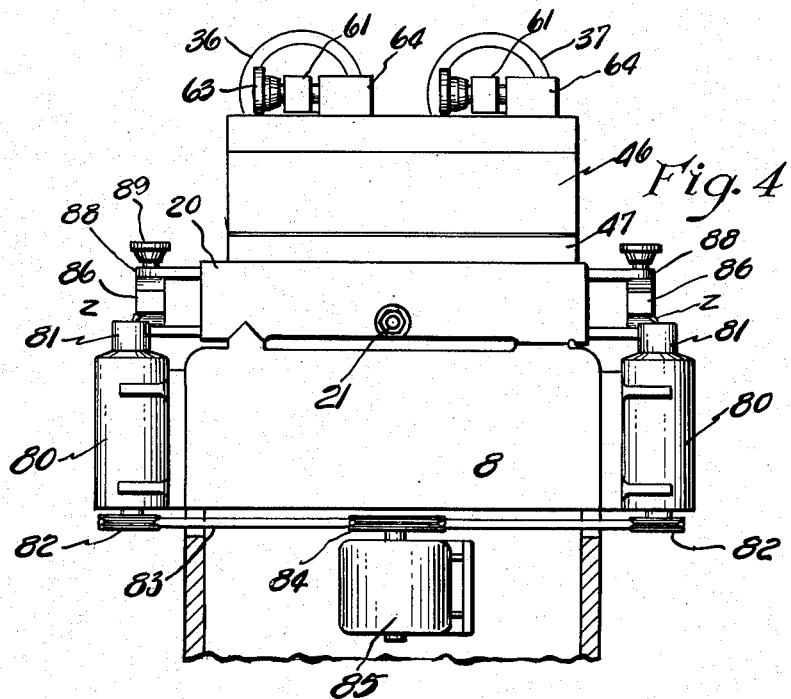
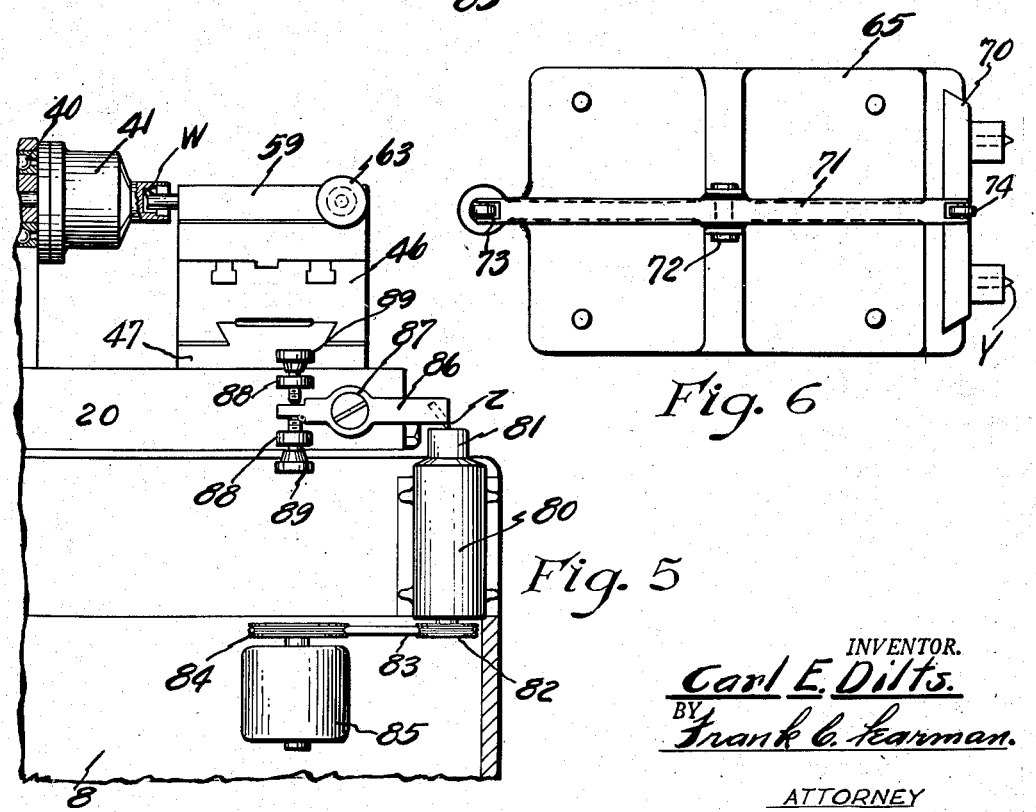
INVENTOR.
Carl E. Dilts.
BY
Frank C. Fearman.
ATTORNEY Nov. 24, 1953

C. E. DILTS 2,659,961

TURNING AND BORING MACHINE

Filed May 22, 1946

INVENTOR.
Carl E. Dilts
BY Frank C. Kearman.
Attorney.

Patented Nov. 24, 1953

2,659,961

UNITED STATES PATENT OFFICE 2,659,961

TURNING AND BORING MACHINE

Carl E. Dilts, Saginaw, Mich., assignor of one-half to Joseph H. Hoern, Saginaw, Mich.

Application May 22, 1946, Serial No. 671,477

5 Claims. (Cl. 29—54)

1

This invention relates to turning and boring machines used for turning, boring and facing bearings, spacers, and similar small parts used in engines and mechanical equipment of all kinds.

One of the prime objects of the invention is to design a machine by means of which small bearings and parts of regular and/or irregular shape may be quickly and accurately bored, turned and/or faced in an economical manner.

Another object is to provide a machine in which accurate tapers may be machined in or on a rotatable part, and which lends itself to accurate mass production of precision finished parts with exact duplication of said parts.

A further object is to design a machine in which the feeding of the table and the tools is cam-controlled and synchronized, one with the other, to the end that one or more complete machine operations is performed during each cycle of the machine.

A still further object is to design a machine on which any desired tool path or pattern, both internal and external, or combinations thereof may be formed, so that any predetermined work contour or pattern may be followed.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 4 is a fragmentary, end-elevational view of the machine.

Fig. 5 is a fragmentary, side-elevational view.

Fig. 6 is a detail top plan view showing the rocker arm and bracket.

Similar reference characters are used to identify similar parts throughout the several views of the drawings.

Figures 1, 8:
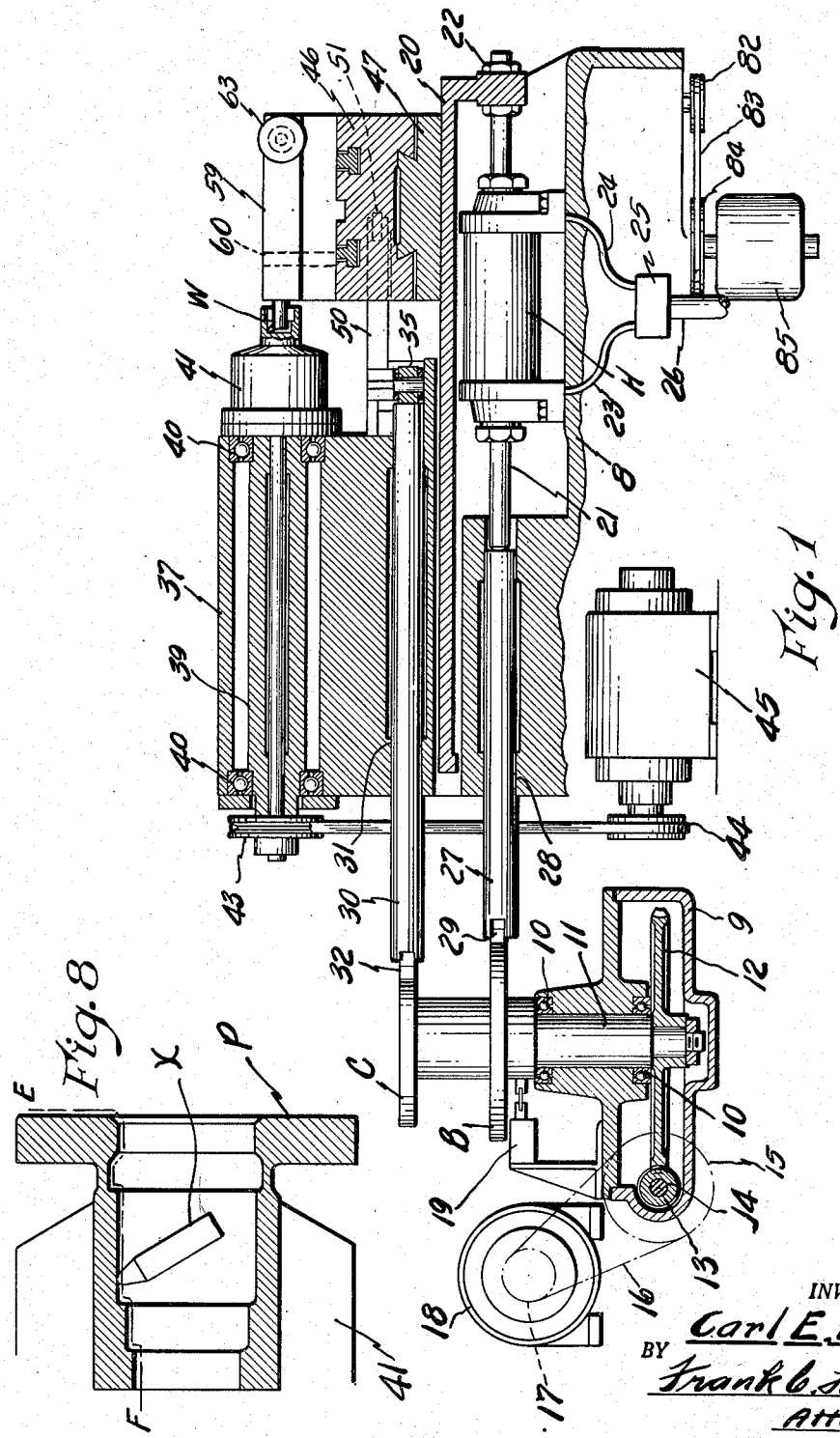
Fig. 1 is a fragmentary, sectional, side-elevational, diagrammatic view of my turning and boring machine.
Fig. 8 is an enlarged, sectional view of a typical work-piece and a cutting tool, the broken line illustrating the tool path or pattern.
Figures 2, 3:
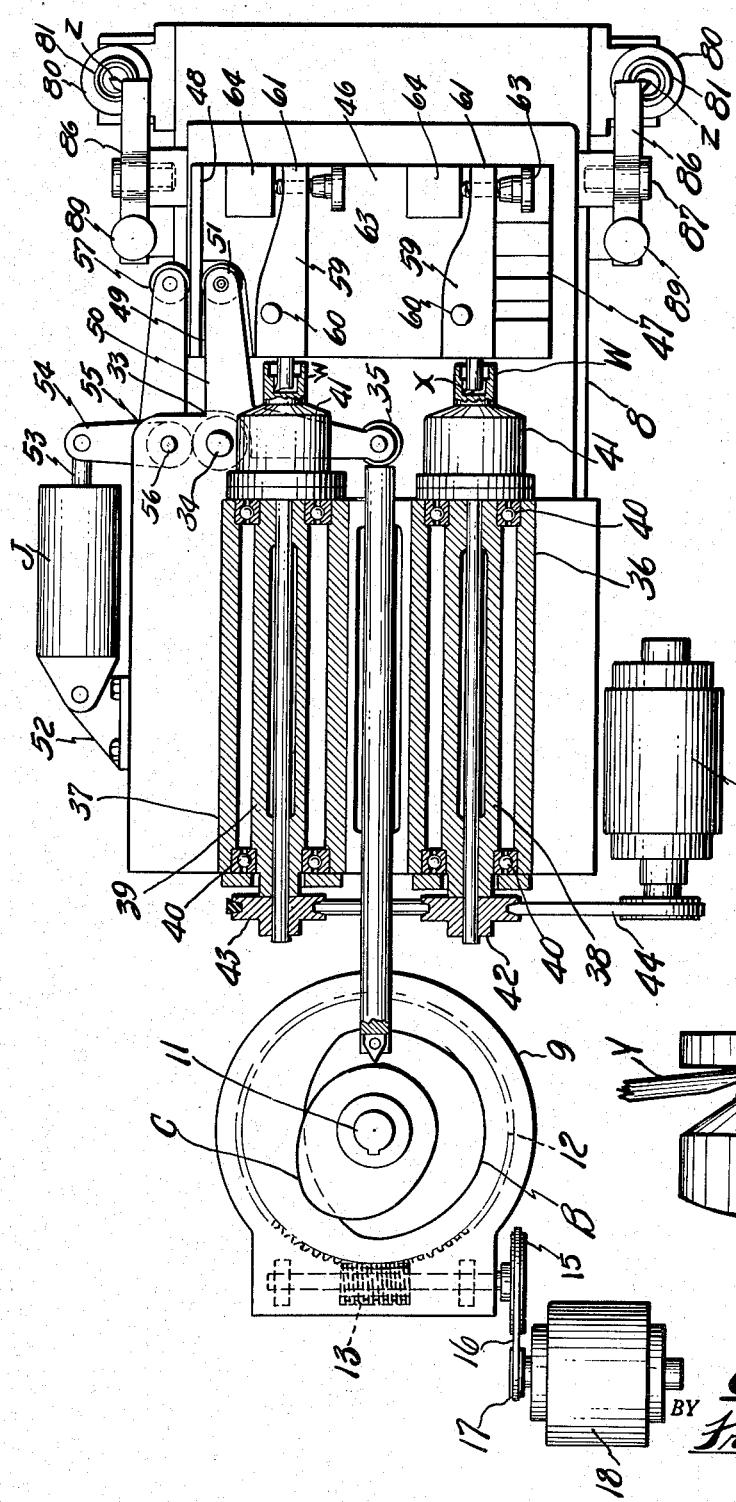
Fig. 2 is a fragmentary, top plan view thereof.
Fig. 3 is an enlarged, fragmentary view of a typical work-piece showing also one of the cutting tools.

The invention as herein referred to comprises a customary main frame 8 which can be of any desired shape and design, it includes a gear housing 9 provided with vertically spaced bearings 10 in which a vertical shaft 11 is journaled, and a wormwheel 12 is carried by said shaft and has toothed engagement with a worm 13 mounted on a horizontally disposed shaft 14. A pulley 15 is also mounted on the shaft 14 outside the housing 9, and a belt 16 drivingly connects said pulley with the driving pulley 17 of a conventional motor 18.

Vertically spaced cams "B" and "C" are mounted on the upper end of the shaft 11, and a contact switch 19 is provided on the housing 9 and for a purpose to be hereinafter described.

A table 20 is mounted on the frame 8 and is longitudinally movable thereon, an air cylinder "H" being mounted on said frame, and includes a piston (not shown), to which one end of a piston rod 21 is connected, the opposite end of said piston rod being secured to the table 20 by means of nuts or the like.

Individual air lines 23 and 24 open into the respective ends of the cylinder "H," and lead to a solenoid operated valve 25, and a main air line 26 connects the cylinder to any suitable source of air supply.

A push rod 27 is slidably mounted in a passage 28 provided in the frame 8, and a cam follower 29 is journaled on the one end thereof for engagement with the face of the cam "B," the opposite end of the rod being in contact with the end of the piston rod 21, so that air pressure maintains the follower 29 in intimate engagement with the face of the cam during the work cycle.

A push rod 30, similar to rod 27, is slidably mounted in a passage 31 provided on the frame 8, and is provided with a follower 32 on the one end thereof for contact engagement with the working face of the cam "C," being held in engagement therewith by means of a bell crank lever 33 which is pivotally mounted on the table 20 at the point 34.

An anti-friction roller 35 is journaled on one leg of the lever 33, said roller engaging the one end of the push rod 30 for actuating the lever as the cam is driven.

Spindle housings 36 and 37 respectively are provided on the frame 8, and spindles 38 and 39 are journaled in longitudinally spaced bearings 40 provided in said housings, chucks 41 being provided on the ends of the spindles, and a cylindrical work-piece "W" is mounted therein.

Pulleys 42 and 43 are provided on the ends of the respective spindles 38 and 39, and a belt 44 serves to drivingly connect the pulleys with a motor 45 for driving said spindles as usual.

A transversely disposed tool slide 46 is mounted on the table 20 and includes a bed 47 on which the tool slide travels, said slide being formed with a raised end wall 48, and the face of the slide directly adjacent said end wall is recessed as at 49 to accommodate the leg 50 of the bell crank lever 33.

An anti-friction roller 51 is journaled on the end of the leg 50 and bears against the inner face of the end wall, said lever serving to shift the tool slide on the bed as the cam "C" is actuated.

An air cylinder "J" is pivotally mounted on a bracket 52 which is secured to the side wall of the frame 8, and is connected to any suitable source of air supply, a piston (not shown), being slidably mounted in the cylinder "J," and a piston rod 53 is connected thereto, the outer end of said rod being pivotally connected to the leg 54 of a bell crank lever 55, which lever is in turn pivotally mounted on the frame at the point 56.

A roller 57 is journaled on the opposite leg 58 of the lever 55 and engages the end wall 48 of the slide, the cylinder "J" supplying necessary pressure to maintain the follower 32 in contact with the cam "C" and shift the slide accordingly.

Tool holders 59 are pivotally mounted on pins 60 provided on the tool slide 46, these holders being identical in construction, the front end 61 being reduced as shown and a horizontally disposed adjusting screw 63 is mounted therein, these screws bearing against tool slide abutments 64 and can be readily manipulated to facilitate pivotal adjustment of the holders.

Cutting tools "X" are mounted in the tool holders 59, and as the machine is operated, these tools travel through a predetermined tool cutting path or contour, a typical flanged work-piece "P" being shown in Fig. 8 of the drawings, and the tool path for said piece is indicated by the broken line E—F.

Figure 7:
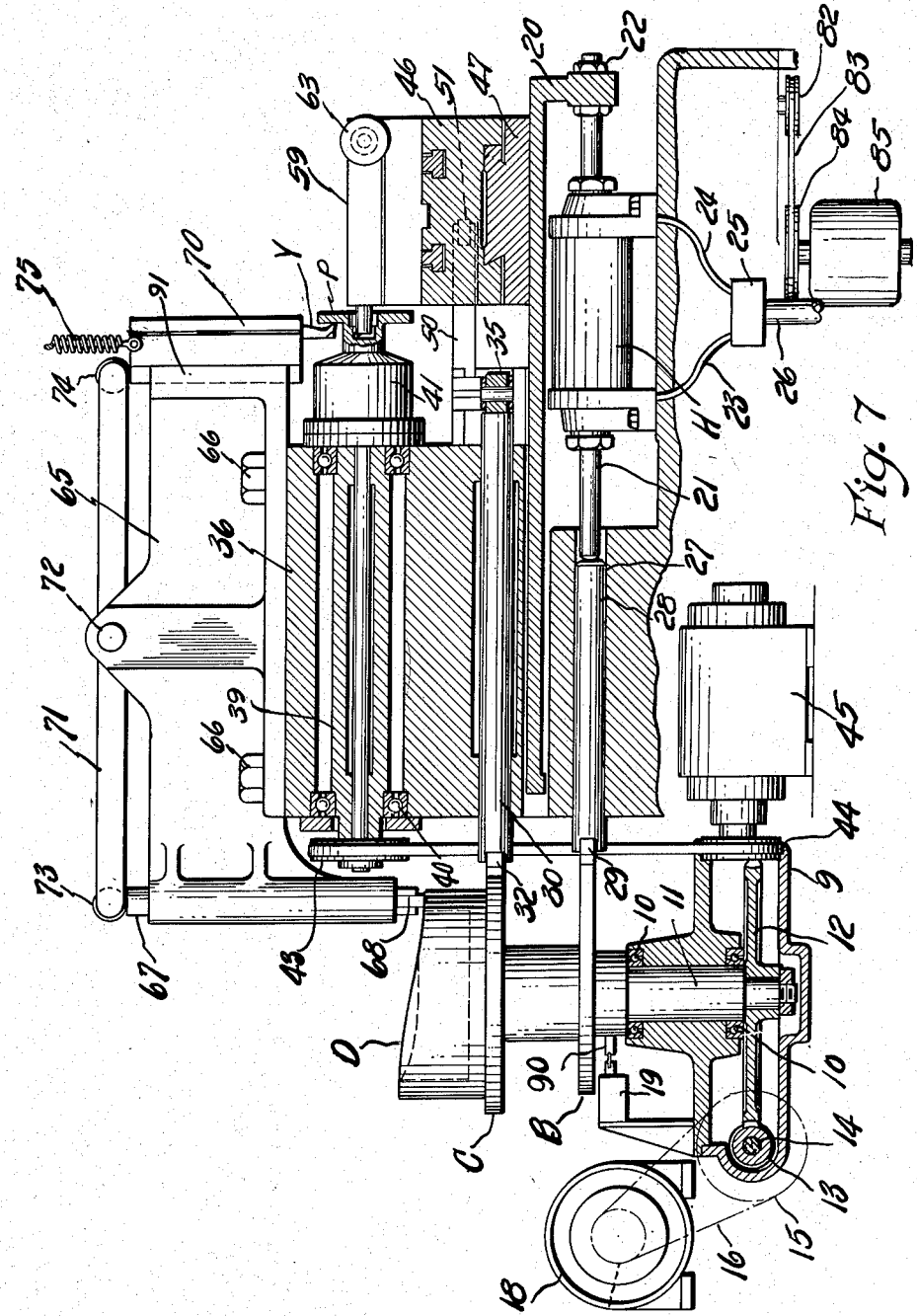
Fig. 7 is a view similar to Fig. 1 showing a slightly modified design that includes means for external machining.

When it is desired to perform a back facing and/or turning operation simultaneously with the cutting operation, I provide the arrangement shown in Fig. 7 of the drawings, a bracket 65 being mounted on the spindle housing 36 by means of bolts 66, and a push rod 67 is slidably mounted in the one end of the bracket, a follower 68 being journaled on the lower end of the push rod, and engages the face of a cam "D" which can be secured to or formed integral with the cam "C."

The opposite end of the bracket 65 is formed with gibs 91 in which a tool carrier 70 is slidably mounted, and a cutting tool "Y" is mounted thereon.

A horizontally disposed rocker arm 71 is pivotally mounted on a pin 72 provided on the bracket 65, and rollers 73 and 74 are journaled on the ends of the arm for engaging the push rod and tool carrier respectively to feed the tool "Y" to the work which can be faced, undercut, or turned as the machine is operated, rotation of the cam "D" actuating the rocker arm and the tool carrier, any resilient means, such as a spring 75 can be attached to the carrier for returning it to original position when the work cycle is completed.

In many instances it is necessary to face both ends of a work-piece, in addition to external and internal machining, and I therefore provide vertical spindle assemblies 80 on the main frame, chucks 81 being provided on the upper ends of the spindles for accommodating the work-pieces, and sheaves 82 are mounted on the lower ends of the spindles, a belt 83 serving to drivingly connect the sheaves 82 with the drive pulley 84 of a motor 85. The spindles are of the same design previously described.

Tool holders 86 are pivotally mounted on the table 20 by means of pins 87, and a cutting tool "Z" is mounted on each holder. Lugs 88 project from the sides of the table and adjusting screws 89 are mounted therein for tool adjustment.

After the work-pieces have been internally bored or machined, and the flange faced and/or chamfered etc., the operator, standing at the front of the machine, removes the finished work-pieces and places them in the chucks 81; with the unfinished ends exposed. He then reloads the chucks 41, and these unfinished ends will be faced during the next work cycle and simultaneously with the work-pieces in the chucks 41.

It will, therefore, be obvious that one or more work-pieces are finished during each complete cycle of the machine.

A typical work cycle is as follows:

Work-pieces "W" that have been previously rough finished, are loaded in the work chucks 41 by the operator; and motors 18, 45, and 85, together with the solenoids of the electrically actuated air valves 25 that move the table, are then energized to bring the tools to working position "E," as indicated in broken lines in Fig. 8 of the drawings. The cam "B" then moves the table 20 longitudinally so that the work is brought into proper position with relation to the cutting tools, and cam "C," being on the same shaft as cam "B," is simultaneously actuated. Cam "C" controls the transverse movement of the tool slide 46 through push rod 30 that actuates the bell crank lever 33, and this lever shifts the tool slide accordingly, the cams being fashioned and synchronized to produce the desired tool path or pattern.

The air cylinders "H" and "J" maintain the followers in engagement with the cams, and when the work cycle is completed, the projecting lug 90 engages the limit switch 19 which energizes the solenoid 25 for admitting air to air cylinder "H" through line 23 to return the table to original position, the finished work is then unloaded and the chucks are again reloaded with unfinished pieces preparatory to repeating the work cycle.

When it is necessary to finish or face the flange or external surface of the work-piece "P," the arrangement shown in Fig. 7 is utilized, the cam "D" actuating the rod 67 to rock the rocker arm 71, so that the follower 74 feeds the carrier 70 and tool "Y" to the flange of the work-piece simultaneously with the internal machining of said pieces, the cam "D" being fashioned to provide the desired tool path or pattern.

Any resilient means such as a spring 75 is provided for returning the carrier to original starting position and maintaining the follower in engagement with the cam.

If it is desired to face the ends of the work-pieces that are bottomed in the chucks, the operator removes the pieces from the chucks at the end of the work cycle and places them, unfinished end up, in the spindles 80 so that they will be faced by the tools "Z" during the next work cycle.

From the foregoing description, it will be understood that the cam "B" controls all longitudinal movements of the table, while the cam "C" controls all transverse movements of the slide 46, and these cams can be fashioned and synchronized to provide longitudinal movement, transverse movement, and any combination or variation of these movements so that any desired tool path or pattern can be provided.

What I claim is:

1. A machine of the character described comprising in combination, a main frame, a longitudinally movable table mounted thereon, a cam-actuated transversely disposed tool slide mounted on said table, tools on said slide, driven spindles on the frame and including chucks in which the work is mounted for being operated upon by corresponding tools on said slide, a cam for moving said tool slide, a bell crank on said frame with one leg in contact with the slide, and a push rod extending parallel with said spindles interposed between said cam and the opposite leg of the bell crank for shifting said slide as the cam is driven, said spindles being arranged between the cam and tool slide to provide unobstructed access to the front and both sides of the machine tool by an operator attendant.

2. The combination as defined in claim 1, in which a raised rib is provided on the slide in engagement with one leg of the cam actuated bell crank, and a pressure-actuated bell crank in engagement with the opposite side of said rib for shifting the slide transversely as the cam and pressure driven bell crank are actuated.

3. In a machine tool of the class described, a machine frame, a horizontal work supporting spindle rotatably mounted on said frame, a longitudinally movable table mounted at one end of said frame to slide toward and away from said spindle, a transversely movable slide mounted on said table, a cutting tool supported by said slide and arranged to be presented to work supported by said spindle, a power shaft mounted rearwardly of the machine at the opposite end of the frame, cam members on said shaft, a push rod extending between one of the cams and the table for moving the same longitudinally, a push rod extending between the other cam and said tool slide and a bell crank lever pivoted to the frame and arranged with one of its ends in engagement with said second named push rod and its opposite arm in engagement with said tool slide.

4. In a machine tool of the class described, a machine frame, a horizontal work supporting spindle rotatably mounted on said frame, a chuck on one end of said spindle for supporting a workpiece, a longitudinally movable table mounted adjacent one end of said frame, a transversely movable slide mounted on said table, a cutting tool on said slide adapted to be presented to a workpiece in said chuck, a drive shaft at the opposite end of said frame, separate cam members on said drive shaft, a push rod having one end in engagement with one of said cams and its opposite end connected to said table, a second push rod having one end engageable with the other cam, a bell crank lever pivoted to the frame with one leg thereof engaging said second mentioned push rod and its other end engaging said tool slide, and pressure fluid means for urging said table and slide in a direction opposite to the direction imparted thereto by said push rods and bell crank.

5. In a machine tool, a frame, a pair of horizontal work supporting spindles journaled on said frame in spaced apart parallel relation, work supporting chucks on one end of each spindle, a table slidably mounted for longitudinal movement adjacent one end of said frame, a slide mounted on said table for transverse movement, a pair of cutting tools mounted on said slide and arranged to operate upon corresponding workpieces held by said chucks, a power shaft located at the opposite end of said frame, a pair of independent cams on said shaft, a push rod extending forwardly with one end engaged by one of said cams and its opposite end in engagement with said table, a second push rod also extending forwardly in engagement with the other of said cams, a bell crank lever pivoted to said frame having one of its legs in engagement with said second push rod and its other leg in engagement with said tool slide, pressure fluid means for urging said table in a direction opposite to said push rod movement, and pressure fluid means for urging said tool slide in a direction opposite to the movement imparted thereto by said bell crank lever.

CARL E. DILTS.

References Cited in the file of this patent
UNITED STATES PATENTS

| Number | Name | Date |
|---|---|---|
| 732,558 | Hills | June 30, 1903 |
| 737,974 | Todd | Sept. 1, 1903 |
| 870,499 | English | Nov. 5, 1907 |
| 1,527,208 | Melling | Feb. 24, 1925 |
| 2,225,409 | Bromley | Dec. 17, 1940 |
| 2,255,170 | Kelly | Sept. 9, 1941 |
| 2,326,073 | Seyferth | Aug. 3, 1943 |
| 2,368,614 | Raibourn | Feb. 6, 1945 |